United States Patent
Bomhoff et al.

(10) Patent No.: US 7,519,693 B2
(45) Date of Patent: Apr. 14, 2009

(54) APPARATUS, SYSTEM, AND METHOD FOR INTEGRATING AN ENCLOSURE

(75) Inventors: Matthew David Bomhoff, Tucson, AZ (US); Brian James Cagno, Tucson, AZ (US); John Charles Elliott, Tucson, AZ (US); Robert Akira Kubo, Tucson, AZ (US); Gregg Steven Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 10/992,579

(22) Filed: Nov. 18, 2004

(65) Prior Publication Data

US 2006/0106952 A1    May 18, 2006

(51) Int. Cl.
*G06F 15/16* (2006.01)
(52) U.S. Cl. .................. 709/220; 709/228
(58) Field of Classification Search .............. None
See application file for complete search history.

(56) References Cited

U.S. PATENT DOCUMENTS

| | | | |
|---|---|---|---|
| 5,615,352 A | 3/1997 | Jacobson et al. ............ 395/441 |
| 5,875,456 A | 2/1999 | Stallmo et al. ............... 711/114 |
| 6,061,752 A | 5/2000 | Jones et al. .................. 710/103 |
| 6,314,488 B1 * | 11/2001 | Smith .......................... 710/240 |
| 6,480,934 B1 | 11/2002 | Hino et al. ................... 711/114 |
| 6,691,121 B1 | 2/2004 | Heronimus et al. ......... 707/101 |
| 2003/0005100 A1 * | 1/2003 | Barnard et al. .............. 709/223 |
| 2003/0074451 A1 * | 4/2003 | Parker et al. ................. 709/227 |
| 2003/0095549 A1 | 5/2003 | Berman ...................... 370/392 |
| 2003/0177236 A1 * | 9/2003 | Goto et al. ................... 709/225 |
| 2004/0107246 A1 * | 6/2004 | Akashika et al. ............ 709/203 |

* cited by examiner

*Primary Examiner*—Patrice Winder
*Assistant Examiner*—Minh-Chau Nguyen
(74) *Attorney, Agent, or Firm*—Kunzler & McKenzie (57) ABSTRACT

An apparatus, system, and method are disclosed for integrating an enclosure. An initialization module initializes a second enclosure. A discovery module discovers a connection of the second enclosure to a first enclosure. An address module creates a valid address for the second enclosure. An assignment module assigns the address to the second enclosure. A power control module cycles power to the second enclosure to reinitialize the second enclosure and set the address.

26 Claims, 8 Drawing Sheets

APPARATUS, SYSTEM, AND METHOD FOR INTEGRATING AN ENCLOSURE

BACKGROUND OF THE INVENTION

1. Field of the Invention

This invention relates to integrating an enclosure and more particularly relates to automated integration of a modular enclosure in a data processing system.

2. Description of the Related Art

A data processing system often includes one or more components configured as modular enclosures. For example, servers, storage devices, switches, and the like may be packaged in modular enclosures referred to herein as enclosures. Each enclosure is a functional component that may be used by the system when the enclosure is integrated. An administrator may add capacity to the data processing system by connecting a second enclosure to a first enclosure or a control unit through a communication channel.

The second enclosure may be integrated to the data processing system by establishing the communication channel to the second enclosure. In one embodiment, the second enclosure is cascade cabled, wherein each enclosure is connected to an upstream enclosure or a control unit, and each enclosure is further connected to a downstream enclosure, the connections forming a serial chain from the control unit to a terminal enclosure. In an alternate embodiment, the second enclosure is connected in parallel to the first enclosure. For example, the second enclosure and first enclosure may each be cabled to the control unit.

The second enclosure is further integrated by providing power to the second enclosure and by establishing one or more logical addresses and identifiers to facilitate communication between the second enclosure and the other enclosures and control unit. The administrator typically performs the integration, including connecting the communication channel cables, power cables, and assigning the logical addresses and identifiers.

Unfortunately, many errors can occur during integration. For example, the administrator may assign an inappropriate logical address or identifier to the second enclosure or enclosure components, such as the logical address or identifier of a storage device in the first enclosure. In addition, the administrator may incorrectly cable the second enclosure, or provide power to the second enclosure at the wrong time or in the wrong sequence. These integration errors may reduce the performance of the data processing system or disable the data processing system until the errors are corrected. In addition, finding and correcting integration errors may be time consuming and costly.

From the foregoing discussion, it should be apparent that a need exists for an apparatus, system, and method that automate the integration of an enclosure in a data processing system. Beneficially, such an apparatus, system, and method would reduce integration errors and simplify an administrator's integration tasks.

SUMMARY OF THE INVENTION

The present invention has been developed in response to the present state of the art, and in particular, in response to the problems and needs in the art that have not yet been fully solved by currently available enclosure integration methods. Accordingly, the present invention has been developed to provide an apparatus, system, and method for integrating an enclosure that overcome many or all of the above-discussed shortcomings in the art.

The apparatus to integrate an enclosure is provided with a logic unit containing a plurality of modules configured to functionally execute the necessary steps of initializing an enclosure, discovering a connection of the enclosure, creating an address, assigning the address, and cycling power to the enclosure. These modules in the described embodiments include a discovery module, an initialization module, an address module, an assignment module, and a power control module.

The discovery module discovers a connection of a second enclosure to a first enclosure. In one embodiment, the first and second enclosures include modular servers, hard disk drives, optical storage devices, and the like. The first and second enclosures are connected by a communication channel such as a fibre channel arbitrated loop communication channel or the like.

The initialization module initializes the second enclosure. The initialization module may command the setup and configuration of communications with the communications channel. In one embodiment, the initialization module may configure a fibre channel switch to communicate through the fibre channel arbitrated loop communication channel.

The address module creates a valid address for the second enclosure or each of one or more components of the second enclosure. The address identifies the second enclosure or the second enclosure component in communication through the communication channel. In one embodiment, the address module creates the address using an algorithm. In an alternate embodiment, the address module directs an administrator to create the address.

The assignment module assigns the address to the second enclosure. In one embodiment, the assignment module communicates the address to the second enclosure and the second enclosure stores the address. The power control module cycles power to the second enclosure to reinitialize the second enclosure and set the address if, for example, the enclosure only recognizes an address that is loaded during initialization. The apparatus integrates the second enclosure, configuring the second enclosure or one or more components such as storage devices of the second enclosure with a valid address and enabling communication with the first enclosure or control unit.

A system of the present invention is also presented to integrate an enclosure. The system may be embodied in a data processing system such as a data storage system comprising a plurality of modular data storage devices configured as enclosures. In particular, the system, in one embodiment, includes a first enclosure, a second enclosure comprising an initialization module, and a control unit comprising a discovery module, an address module, an assignment module, and a power control module.

The control unit, first enclosure, and second enclosure may be connected by cascade cabling, with the control unit connected by a communication channel to the first enclosure and the first enclosure connected by the communication channel to the second enclosure. The control unit communicates messages to the first enclosure. The first enclosure receives and retains messages with the address of the first enclosure or one or more components of the first enclosure and communicates other messages to the second enclosure. The second enclosure requires a valid address for the second enclosure for one or more components of the second enclosure to receive and retain the messages.

The discovery module discovers a connection of the second enclosure to the first enclosure. The initialization module initializes the second enclosure. The address module creates a valid address for the second enclosure or each of one or more components of the second enclosure. The assignment module assigns each address to the second enclosure or the one or more components of the second enclosure. In one embodiment, each component may receive a unique address. The power control module may cycle power to the second enclosure to reinitialize the second enclosure or the one or more components of the second enclosure and set each address.

In addition, the system may further comprise a detection module, a mitigation module, and a notification module. In one embodiment, the detection module detects a connection error between the first enclosure and the second enclosure. For example, the detection module may detect improper cabling between the first and second enclosure. The mitigation module mitigates the connection error. In one embodiment, the mitigation module isolates the second enclosure from the first enclosure, preventing the second enclosure from interfering with system operations.

In one embodiment, the notification module notifies an administrator that the second enclosure is online. In addition, the notification module may notify the administrator when the detection module detects a connection error between the first and second enclosure. The system integrates the second enclosure with a valid address and detects and mitigates a connection error between the first and second enclosures.

A method of the present invention is also presented for integrating an enclosure. The method in the disclosed embodiments substantially includes the steps necessary to carry out the functions presented above with respect to the operation of the described apparatus and system. In one embodiment, the method includes initializing an enclosure, discovering a connection of the enclosure, creating an address, assigning the address, and cycling power to the enclosure.

In one embodiment, an administrator connects a second enclosure to a first enclosure. An initialization module initializes the second enclosure. A discovery module discovers a connection of the second enclosure to a first enclosure. In a certain embodiment, a detection module detects a connection error between the first and second enclosures. If the connection error is detected, a mitigation module may mitigate the error. An address module creates at least one valid address for the second enclosure. An assignment module assigns the address to the second enclosure or one or more addresses to one or more components of the second enclosure. In one embodiment, a power control module cycles power to the second enclosure to reinitialize the second enclosure and set each address.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention automates the integration of a second enclosure to a first enclosure of a system. In addition, the present invention assigns a valid address to the second enclosure and detects and mitigates errors in connecting the first and second enclosures. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
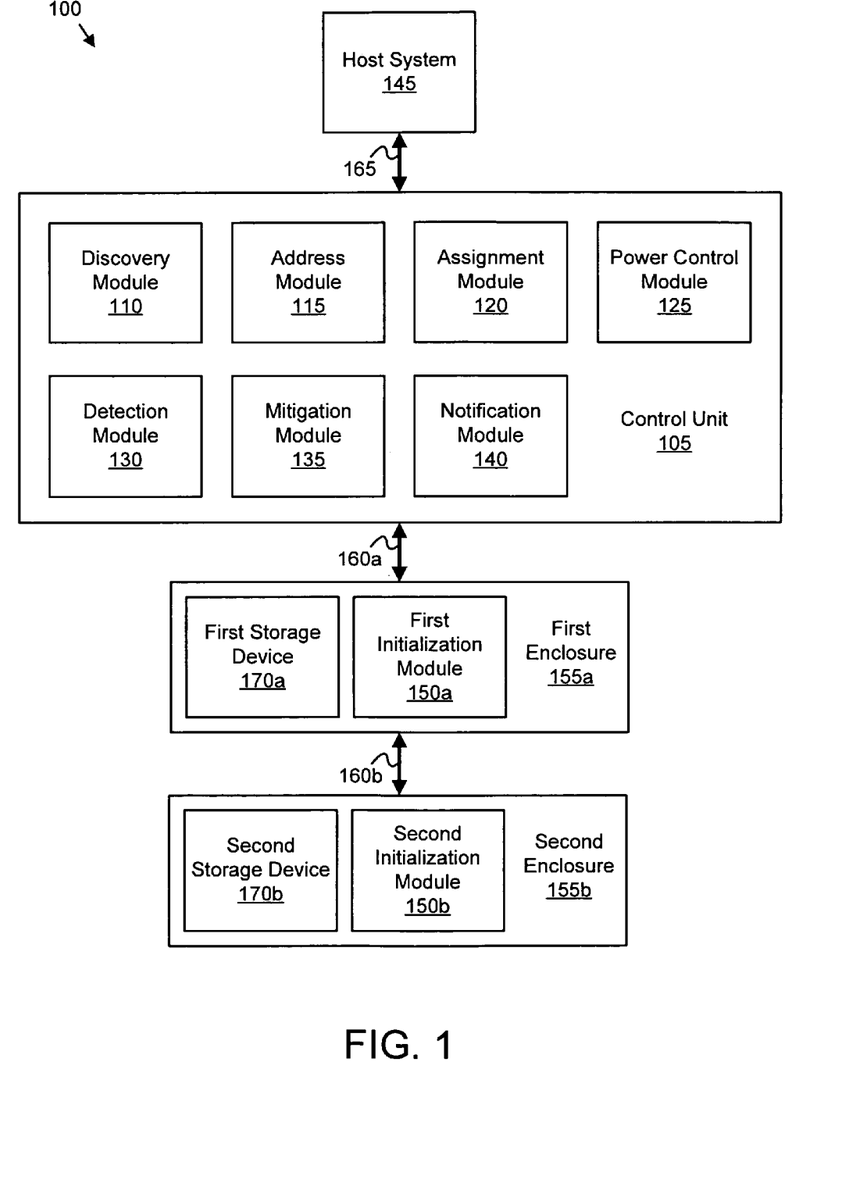
FIG. 1 is a schematic block diagram illustrating one embodiment of an integration system in accordance with the present invention.

FIG. 1 is a schematic block diagram illustrating one embodiment of an integration system 100 in accordance with the present invention. The system 100 includes a host system 145, one or more enclosures 155 each comprising an initialization module 150 and a storage device 170, and a control unit 105 comprising a discovery module 110, an address module 115, an assignment module 120, a power control module 125, a detection module 130, a mitigation module 135, and a notification module 140. Although the system 100 is depicted with one host system 145, one control unit 105, and two enclosures 155, any number of host systems 145, control units 105, and enclosures 155 may be employed. In addition, each enclosure 155 may include one or more storage devices 170.

In one embodiment, the control unit 105 is configured as a server of a data storage system, and storage devices 170 are configured as hard disk drives. In an alternate embodiment, the storage devices 170 are configured as optical storage devices, micromechanical storage devices, or the like. The control unit 105 may access data for the host system 145 from the storage devices 170 of the enclosures 155. For example, the host system 145 may request data stored on the first storage device 170*a* of the first enclosure 155*a* through a network interface 165. The control unit 105 retrieves the requested data from the first storage device 170*a* through a communication channel 160 and communicates the data to the host system 145 through the network interface 165.

As depicted, the control unit 105, the first enclosure 155*a*, and the second enclosure 155*b* may be connected through the communication channel 160, which may be configured as cascade cabling. The control unit 105, in one embodiment, is connected by a first communication channel 160*a* to the first enclosure 155*a*, and the first enclosure 155*a* is connected by a second communication channel 160*b* to the second enclosure 155*b*. In select embodiments, the communication channel 160 is a fibre channel arbitrated loop as specified by the American National Standards Institute of Washington, D.C.

The control unit 105 and the enclosures 155 communicate messages through the communication channel 160. Each message may include a destination address or address identifying the destination of the message. In addition, each message may include a source address identifying the source of the message. The control unit 105 and each storage device 170 of each enclosure 155 of the system 100 are assigned an address. A valid address references one device, such as an enclosure 155 or a storage device 170, and conforms to the requirements of the communication channel 160.

In one embodiment, the control unit 105 may communicate messages to the first enclosure 155*a*. The first enclosure 155*a* subsequently receives and retains each message with the address of the first storage device 170*a*, and receives and communicates messages with addresses to the second enclosure 155*b*. The second enclosure 155*b* may receive and retain messages addressed to the second storage device 170*b*.

The first enclosure 155*a* may communicate a message from the first storage device 170*a* to the control unit 105 through the first communication channel 160*a*. The second enclosure 155*b* may also communicate one or more messages comprising the address of the control unit 105 from the second storage device 170*b* to the control unit 105 through the second communication channel 160*b*, the first enclosure 155*a*, and the first communication channel 160*a*.

For example, the control unit 105 may communicate a request for data as a first message to the second enclosure 155*b*. The first message includes the address of the second storage device 170*b*. The first enclosure 155*a* receives the first message, determines that the first message is not addressed to the first storage device 170*b*, and communicates the first message to the second enclosure 155*b*. The second enclosure 155*b* receives and retains the first message, as the first message includes the address of the second storage device 170*b*. The second enclosure 155*b* subsequently forwards the first message to the second storage device 170*b*. The second storage device 170*b* may respond to the request by communicating the requested data as a second message comprising the address of the control unit 105 to the first enclosure 155*a* through the second communication channel 160*b*. The first enclosure 155*a* receives the second message and communicates the second message to the control unit 105 through the first communication channel 160*a*.

The second storage device 170*b* requires a valid address to receive the messages, as the second enclosure 155*b* retains each message with the second storage device's 170*b* address. Integration errors typically caused by an administrator, such as invalid addresses assigned to the second storage device 170*b*, erroneously performed integration operations, or incorrectly cabled first and second enclosures 155*a*, 155*b*, which often slow the performance of the system 100 or require the administrator to take the system 100 offline to correct the errors, may be reduced by minimizing the administrator's involvement during integration. The present invention automates the integration of the second enclosure 155*b*, assuring the assignment of valid addresses, the proper execution of integration operations, and the correct cabling for the second enclosure 155*b*.

In one embodiment, the administrator connects the second enclosure 155*b* to the first enclosure 155*a*. The discovery module 110 discovers the connection of the second enclosure 155*b* to the first enclosure 155*a*. The initialization module 150 initializes the second enclosure 155*b*. The address module 115 creates a valid address for each addressable component of the second enclosure 155*b*, such as the second storage device 170*b*. Although the second enclosure 155*b* is depicted with one second storage device 170*b* component, the second enclosure 155*b* may include any number of addressable components. The assignment module 120 may assign the address to the second storage device 170*b*. The power control module 125 cycles power to the second enclosure 155*b* to reinitialize the second enclosure 155*b* and set the address.

In one embodiment, the second enclosure 155*b* displays the address. For example, the second enclosure 155*b* may display the address on a liquid crystal display ("LCD"). The displayed address may be used to identify the second enclosure 155*b* for service and the like.

In one embodiment, the detection module 130 detects a connection error between the first enclosure 155*a* and the second enclosure 155*b*. For example, the detection module 130 may detect improper cabling of the second communication channel 160*b* between the first and second enclosures 155*a*, 155*b*. The mitigation module 135 may mitigate the connection error. In one embodiment, the mitigation module 135 isolates the second enclosure 155*b* from the first enclosure 155*a*, preventing the second enclosure 155*b* from interfering with system 100 operations.

In one embodiment, the notification module 140 notifies the administrator of the status of the second enclosure 155*b*. In addition, the notification module 140 may notify the administrator when the detection module 130 detects a connection error between the first and second enclosures 155*a*, 155*b*. The notification module 140 may comprise an administrator workstation in communication with the control unit 105. The system 100 integrates the second enclosure 155*b*, providing a valid address to a second enclosure 155*b* and detecting and mitigating a connection error between a first enclosure 155*a* and the second enclosure 155*b*.

Figure 2:
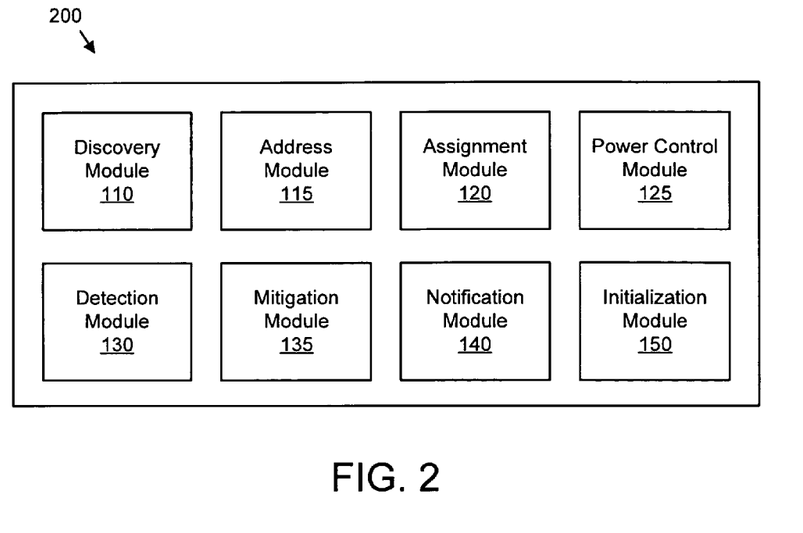
FIG. 2 is a schematic block diagram illustrating one embodiment of an integration apparatus of the present invention.

FIG. 2 is a schematic block diagram illustrating one embodiment of an integration apparatus 200 of the present invention. The apparatus 200 includes a discovery module 110, an address module 115, an assignment module 120, a power control module 125, a detection module 130, a mitigation module 135, a notification module 140, and an initialization module 150. One or more elements of a data processing system, including a control unit 105 and an enclosure 155, may comprise the discovery module 110, address module 115, assignment module 120, power control module 125, detection module 130, mitigation module 135, notification module 140, and initialization module 150.

In one embodiment, the power control module 125 powers on a second enclosure 155*b*. The discovery module 110 discovers a connection of the second enclosure 155*b* to a first enclosure 155*a*. In one embodiment, the first enclosure 155*a* listens for a connection through the second communication channel 160*b*. In a certain embodiment, if the first enclosure 155*a* detects the connection, the first enclosure 155*a* communicates the detected connection to a software program executing on the control unit 105.

The initialization module 150 initializes the second enclosure 155*b*. In one embodiment, the second enclosure 155*b* comprises the initialization module 150. The initialization module 150 may comprise a software program executing on a processing module of the second enclosure 155*b*. The initialization module 150 may command the setup and configuration of communications with the second communication channel 160*b*. In one embodiment, the initialization module 150 may configure a fibre channel switch to communicate through a fibre channel arbitrated loop communication channel.

The address module 115 creates a valid address for a second storage device 170*b* of the second enclosure 155*b*. In one embodiment, the address module 115 creates the address using an algorithm. For example, the address module 115 may query the address of each enclosure 155 in a data processing system such as the integration system 100 of FIG. 1. The address module 115 may further identify the largest numerical address value in the set of addresses and add a specified increment value such as one (1) to the largest numerical address value to form the address. In an alternate embodiment, the address module 115 directs an administrator to create the address. In addition, the address module 115 may verify that the address conforms to the requirements of the communication channel 160 and any specifications of the administrator.

The assignment module 120 assigns the address to the second storage device 170*b*. In one embodiment, the assignment module 120 communicates the address to the second enclosure 155*b*, and the second enclosure 155*b* stores the address for the second storage device 170*b*. In a certain embodiment, the second enclosure 155*b* receives and retains a message comprising the address and stores the address while the second enclosure 155*b* is in a state of being integrated into a system. The storage devices 170 may be configured to only recognize and employ an address that is loaded during initialization of the enclosure 155. Thus, the second storage device 170*b* may only employ the address assigned by the assignment module 120 if the second enclosure 155*b* is restarted and reinitialized.

The power control module 125 cycles power to the second enclosure 155*b* to reinitialize the second enclosure 155*b* and set the address for the second storage device 170*b*. In one embodiment, the power control module 125 only cycles power to the second enclosure 155*b*. In a certain embodiment, the power control module 125 employs features of the communication channel 160 to cycle the power to the second enclosure 155*b*. In an alternate embodiment, the notification module 150 directs the administrator to cycle the power to the second enclosure 155*b*.

The notification module 140 notifies the administrator of the status of the second enclosure 155*b*. In one embodiment, the notification module 140 notifies the administrator when the second enclosure 155*b* is online. In a certain embodiment, the detection module 130 detects a connection error between the first enclosure 155*a* and the second enclosure 155*b*. The detection module 130 may detect the connection error by attempting to communicate through the second communication channel 160*b*. The notification module 140 may notify the administrator that the second enclosure 155*b* is erroneously connected.

The mitigation module 135 may mitigate the connection error. In one embodiment, the mitigation module 135 communicates mitigation instructions to the administrator through the notification module 140. The apparatus 200 configures the second enclosure 155*b* with a valid address and enables communication with the first enclosure 155*a* or the control unit 105.

Figure 3:
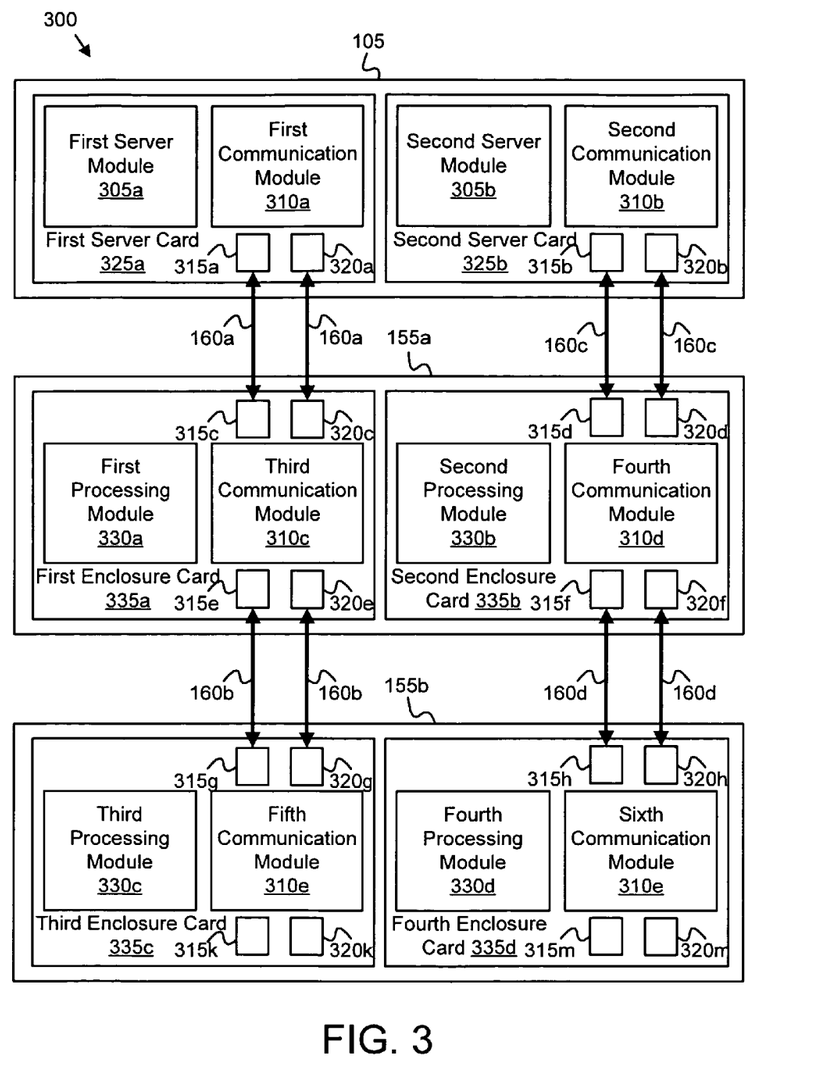
FIG. 3 is a schematic block diagram illustrating one embodiment of a local processor integration system of the present invention.

FIG. 3 is a schematic block diagram illustrating one embodiment of a local processor integration system 300 of the present invention. In the depicted embodiment, a control unit 105 is configured as a server of a data storage system. A control unit 105 includes one or more server cards 325 each comprising a server module 305, a communication module 310, a downstream port 315, and an upstream port 320. The communication module 310, the downstream port 315 and the upstream port 320 may be configured to support a fibre channel arbitrated loop communication channel as is known by those skilled in the art.

A first and second enclosure 155a, 155b may each comprise one or more enclosure cards 335. In addition, each enclosure 155 may also include a storage device 170 as depicted in FIG. 1. Each enclosure card 335 comprises a processing module 330, a communication module 310, one or more downstream ports 315, and one or more upstream ports 320.

In one embodiment, a discovery module 110, an address module 115, an assignment module 120, a power module 125, a detection module 130, a mitigation module 135, and a notification module 140 comprise one or more software programs executing on one or more server modules 305. For example, the discovery module 110, address module 115, assignment module 120, power module 125, detection module 130, mitigation module 135, and notification module 140 executing on the first server module 305a may communicate with the second enclosure 155b through the first communication module 310a, the first downstream port 315a, the first communication channel 160a, the third downstream port 315c, the third communication module 310c, the fifth downstream port 315e, the second communication channel 160b, the seventh downstream port 315g, and the fifth communication module 310e.

In one embodiment, an initialization module 150 comprises one or more software programs executing on the processing module 330. The initialization module 150 executing on the processing module 330 may initialize the communication module 310, including configuring the communication module 310 to communicate with the communication channel 160. In addition, the initialization module 150 executing on the processing module 330 may receive and store the address assigned by the assignment module 120.

Figure 4:
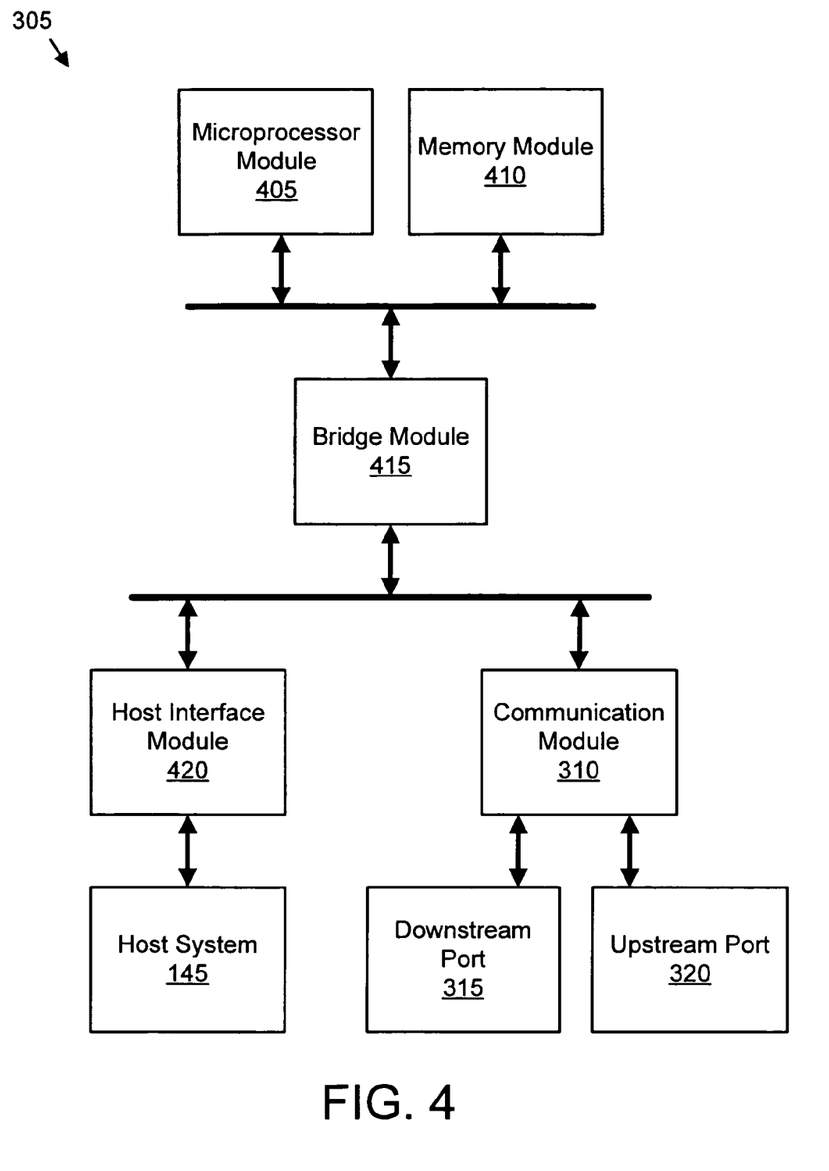
FIG. 4 is a schematic block diagram illustrating one embodiment of a server module of the present invention.

FIG. 4 is a schematic block diagram illustrating one embodiment of a server module 305 of the present invention. The server module 305 includes a microprocessor module 405, a memory module 410, and a bridge module 415. In addition, the server module 305 may communicate with a host system 145 through the bridge module 415 and a host interface module 420. The microprocessor module 405 may also communicate through the bridge module 415 with a communication module 310 such as a fibre channel switch, and through the communication module 310 with a downstream port 315 and an upstream port 320.

The microprocessor module 405, memory module 410, bridge module 415, host interface module 420, and communication module 310 may be fabricated of semiconductor gates on one or more semiconductor substrates. Each semiconductor substrate may be packaged in one or more semiconductor devices mounted on circuit cards. In certain embodiments, connections between the microprocessor module 405, the memory module 410, the bridge module 415, the host interface module 420, and the communication module 310 may be through semiconductor metal layers, substrate to substrate wiring, circuit card traces or wires connecting the semiconductor devices, or the like.

The memory module 410 stores software instructions and data. The microprocessor module 405 executes the software instructions and manipulates the data as is known to those skilled in the art. The microprocessor module 405 may execute the software instructions and communicate with the host interface module 420 and the communication module 310 through the bridge module 415 to execute the functions of a discovery module 110, an address module 115, an assignment module 120, a power module 125, a detection module 130, a mitigation module 135, and a notification module 140.

Figure 5:
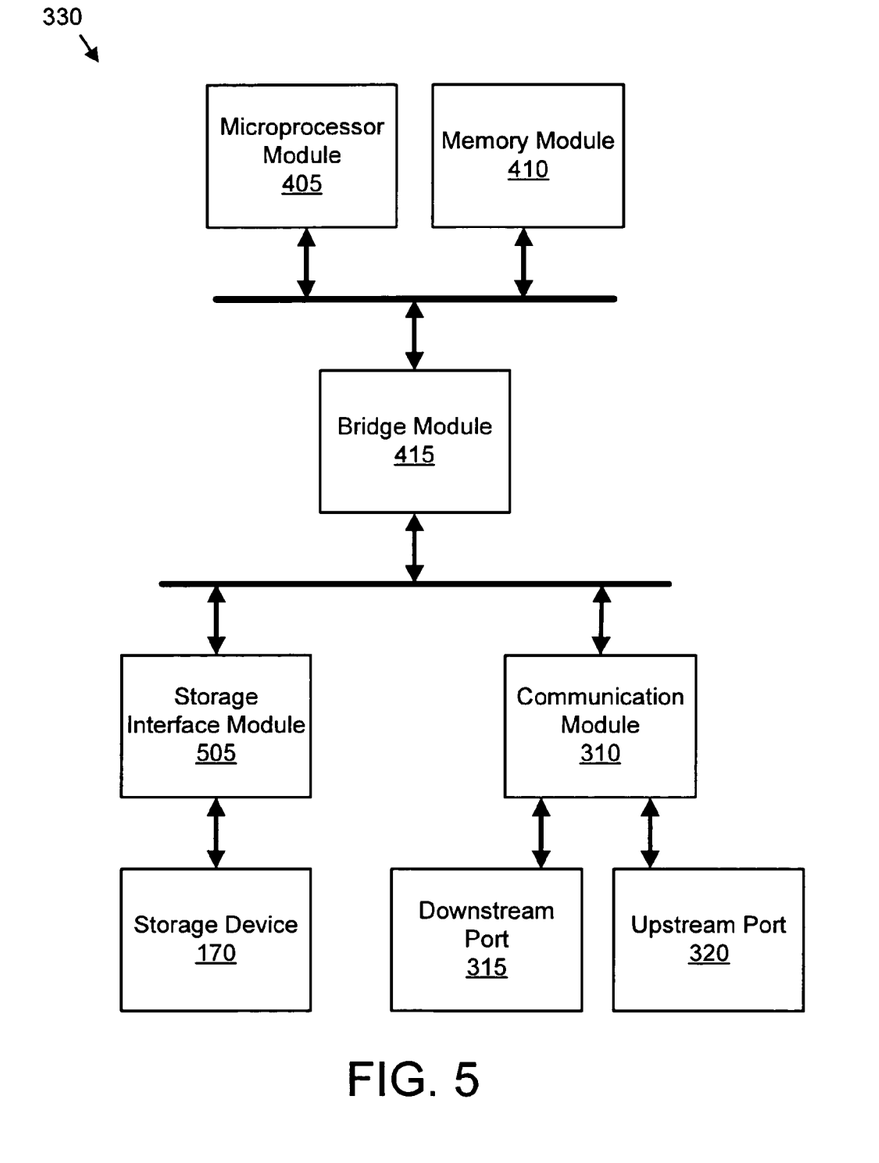
FIG. 5 is a schematic block diagram illustrating one embodiment of a processing module of the present invention.

FIG. 5 is a schematic block diagram illustrating one embodiment of a processing module 330 of the present invention. As depicted, the processing module 330 may include a microprocessor module 405, a memory module 410, and a bridge module 415. In addition, the processing module 330 may communicate with a storage device 170 through the bridge module 415 and a storage interface module 505. The processing module 330 may also communicate through the bridge module 415 with a communication module 310, such as a fibre channel switch.

The microprocessor module 405, memory module 410, bridge module 415, storage interface module 505, and communication module 310 may be fabricated of semiconductor gates on one or more semiconductor substrates, in certain embodiments, and be interconnected as described in FIG. 4. The microprocessor module 405 may execute software instructions and communicate with the storage interface module 505 and the communication module 310 through the bridge module 415 to execute the functions of an initialization module 150.

The following schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
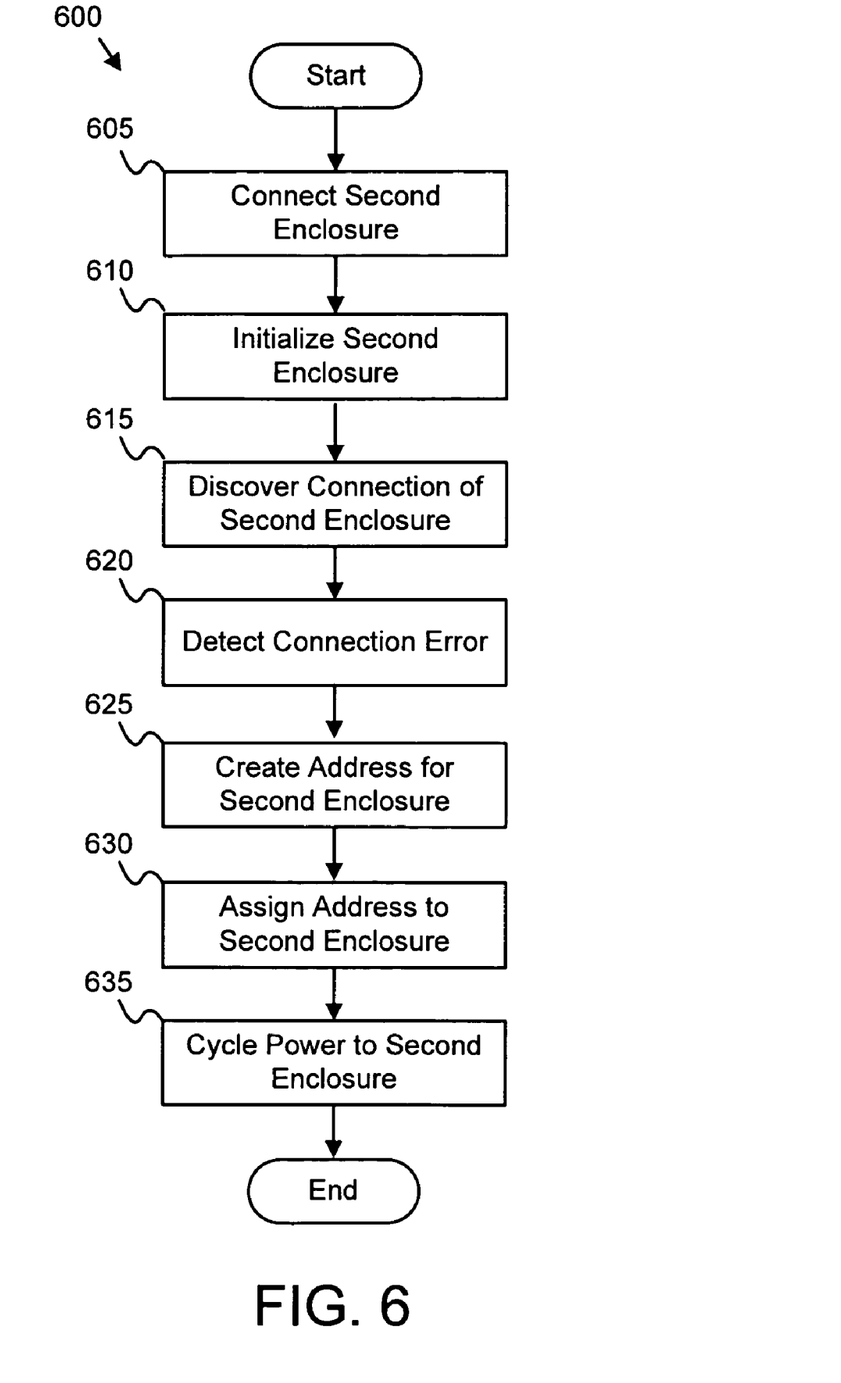
FIG. 6 is a schematic flow chart diagram illustrating one embodiment of an integration method of the present invention.

FIG. 6 is a schematic flow chart diagram illustrating one embodiment of an integration method 600 of the present invention. In one embodiment, an administrator connects 605 a second enclosure 155b to a first enclosure 155a through a communication channel 160. An initialization module 150 initializes 610 the second enclosure. In one embodiment, a power control module 125 initiates the initialization 610 by powering on the second enclosure 155b. In a certain embodiment, the power control module 125 employs power on features of the communication channel 160 to power on the second enclosure 155b. The initialization module 150 may further setup and configure a communication module 310 to communicate though the communication channel 160. For example, the initialization module 150 may configure the communication module 310 as a fibre channel switch.

A discovery module 110 discovers 615 a connection of the second enclosure 155b to a first enclosure 155a. In a certain embodiment, the discovery module 110 resides in the first or the second server module 305a, 305b of the control unit 105 of FIG. 3. In one embodiment, a communication module 310, such as the third communication module 310c or the fourth communication module 310d of the first enclosure 155a, discovers 615 the connection of the second enclosure 155b and communicates the discovery to a server module 305, such as the first server module 305a or the second server module 305b, through the first or second communication modules 310a, 310b.

In one embodiment, a detection module 130 detects 620 a connection error between the first and second enclosures 155a, 155b. The detection module 130 may detect 620 the connection errors when the discovery module 610 has discovered 615 the connection of the second enclosure 155b, but when the detection module 130 is unable to exchange specified communications with the second enclosure 155b. If a connection error is detected 620, a mitigation module 135 may mitigate the error. In one embodiment, the detection module 130 resides in the first or the second server module 305a, 305b. In an alternate embodiment, the detection module 130 resides in the first or the second processing module 330a, 330b of the first enclosure 155a.

An address module 115 creates 625 a valid address for the second enclosure 155b. In one embodiment, the address module 115 creates 625 a valid address for one or more components, such as storage devices 170 of the second enclosure 155b. The address uniquely defines the second enclosure 155b or a component of the second enclosure 155b and may comprise a communication channel address such as a fibre channel loop address. In addition, the address may comprise a port identifier, such as for the seventh downstream port 315g, and a card identifier, such as for the third enclosure card 335c or the fourth enclosure card 335d.

In one embodiment, the address module 115 maintains a list of valid addresses with the status of each valid address. For example, each valid address of the list may comprise a hexadecimal word configured as the address and a hexadecimal status word. The status word may indicate that the address is available, or that the address is in use. The address module 115 may create 625 the valid address for the second enclosure 155b by selecting a valid address that is not in use.

In an alternate embodiment, the address module 115 creates 625 the valid address using an algorithm. The algorithm may create 625 the address from the topology of the second enclosure's connection to the control unit 105. For example, the address for the second enclosure 155b may comprise a portion of the first enclosure's address if the second enclosure 155b is connected to the first enclosure 155a. In one embodiment, the address module 115 resides in the first or the second server module 305a, 305b. The server module 305 may use the address to isolate failures. In a certain embodiment, the server module 305 directs service to the second enclosure 155b using the address if there is a connection failure between the first enclosure 155a and the second enclosure 155b.

An assignment module 120 assigns 630 the address to the second enclosure 155b or a component of the second enclosure 155b. In one embodiment, the assignment module 120 resides in the first or second server module 305a, 305b. For example, the first server module 305a may communicate the address through the first communication module 310a, the first downstream port 315a, the first communication channel 160a, the third downstream port 315c, the third communication module 301c, the fifth downstream port 315e, the second communication channel 160b, the seventh downstream port 315g, and the firth communication module 310e to the third processing module 330c. Responsive to receiving the address, the third processing module 330c may assign the address to a storage device 170. In an alternate embodiment, the assignment module 120 assigns 630 the address to the second enclosure 155b through a path other than the communication channel 160, such as a EIA-232 connection as defined by the Electronic Industries Association of Arlington, Va.

In one embodiment, the power control module 125 cycles 635 power to the second enclosure 155b to reinitialize the second enclosure 155b and set the address. In one embodiment, the power control module 125 resides on the first or second server module 305a, 305b. The power control module 125 may cycle 635 power using one or more functions of the communication channel 160. In an alternate embodiment, the power control module 125 resides in the second enclosure 155b, such as in the third or fourth processing module 310c, 310d, and cycles 635 the power upon receipt of the address. The method 600 integrates the second enclosure 155b to the first enclosure 155a and creates 625 and assigns 630 a valid address to the second enclosure 155b.

Figure 7:
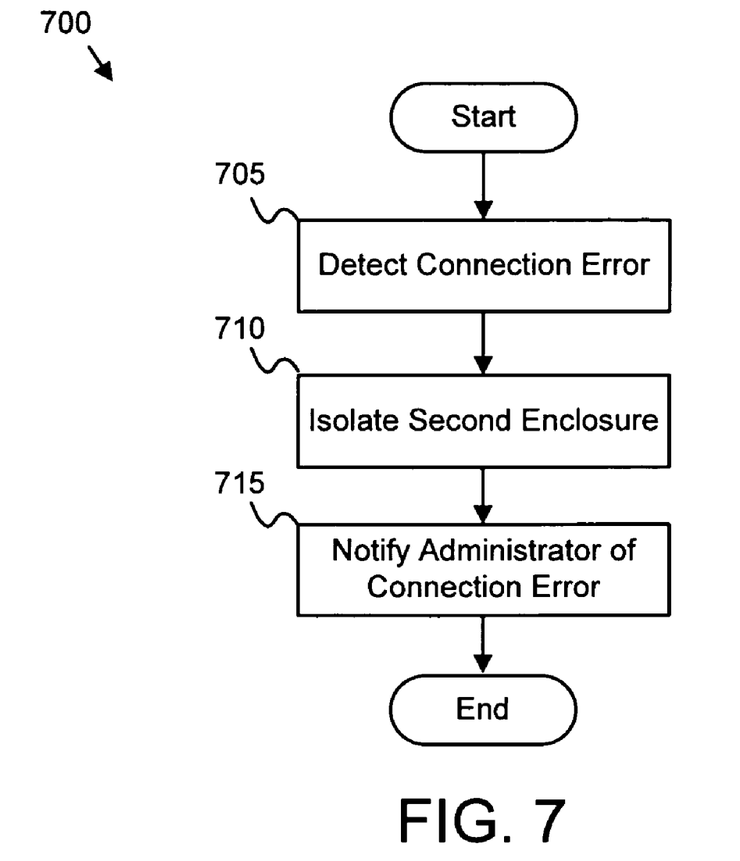
FIG. 7 is a schematic flow chart diagram illustrating one embodiment of a mitigation method in accordance with the present invention.

FIG. 7 is a schematic flow chart diagram illustrating one embodiment of a mitigation method 700 of the present invention. In one embodiment, the detecting 620 connection error step of FIG. 6 comprises the method 700. A detection module 130 detects 705 a connection error between the first and second enclosures 155a, 155b. In one embodiment, a mitigation module 135 mitigates the connection error by isolating 710 the second enclosure 155b.

In one embodiment, the mitigation module 135 isolates 710 the second enclosure 155b by blocking upstream ports 320. In a certain embodiment, the mitigation module 135 isolates 710 the second enclosure 155b by blocking the seventh and eighth upstream ports 320g, 320h of the second enclosure 155b.

In one embodiment, a notification module 140 notifies 715 an administrator of the connection error. The notification module 140 may communicate the notification to an administrator workstation. In a certain embodiment, the notification includes instructions for correcting the error. For example, the notification may include instructions for re-cabling the communication channel 160 to assure a proper connection. The method 700 mitigates connection errors while integrating the second enclosure 155b.

Figure 8:
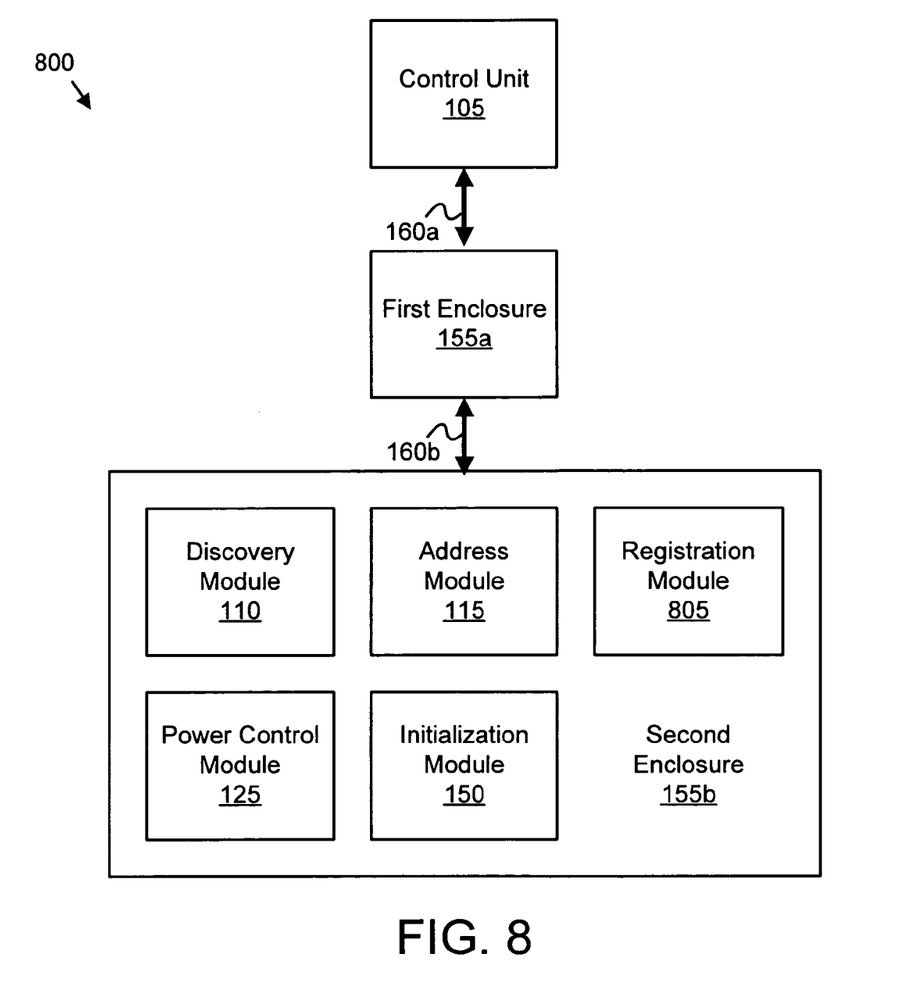
FIG. 8 is a schematic block diagram illustrating one embodiment of an enclosure-based integration system of the present invention.

FIG. 8 is a schematic block diagram illustrating one embodiment of an enclosure-based integration system 800 of the present invention. A discovery module 110, an initialization module 150, an address module 115, a registration module 805, and a power control module 125 reside on a second enclosure 155b. The discovery module 110 discovers the connection of the second enclosure 155b to a first enclosure 155a. The initialization module 150 initializes the second enclosure 155b. The address module 115 creates a valid address for each component, such as a storage device 170 of the second enclosure 155b.

The registration module 805 registers the address to a control unit 105 in communication with the first enclosure 155a. In one embodiment, the registration module 805 communicates the address through a communication channel 160 and the first enclosure 155a to the control unit 105. The power control module 125 cycles power to the second enclosure 155b to reinitialize the second enclosure 155b and set the address. In one embodiment, the registration module 805 receives an acknowledgement that the control unit 105 has received and accepted the address, and the power control module 125 cycles power in response to the acknowledgement.

The present invention automates the integration of a second enclosure 155b to a first enclosure 155a. In addition, the present invention assigns 630 a valid address to the second enclosure 155b and detects 620 and mitigates errors in connecting the first and second enclosures 155a, 155b. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to integrate an enclosure, the apparatus comprising:
    a discovery module comprising executable code stored on a semiconductor device, executed by a processor, and configured to discover a connection of a second enclosure to a first enclosure through a fibre channel arbitrated loop communication channel;
    an initialization module comprising executable code stored on the semiconductor device, executed by the processor, and configured to initialize the second enclosure, the second enclosure comprising the initialization module;
    an address module comprising executable code stored on the semiconductor device, executed by the processor, and configured to create a valid address for the second enclosure;
    an assignment module comprising executable code stored on the semiconductor device, executed by the processor, and configured to assign the address to the second enclosure; and
    a power control module comprising executable code stored on the semiconductor device, executed by the processor, and configured to use the fibre channel arbitrated loop communication channel to cycle power to only the second enclosure to reinitialize the second enclosure, wherein reinitializing the second enclosure sets the address for the second enclosure.

2. The apparatus of claim 1, further comprising a detection module comprising executable code stored on the semiconductor device, executed by the processor, and configured to detect a connection error between the first enclosure and the second enclosure.

3. The apparatus of claim 2, further comprising a mitigation module comprising executable code stored on the semiconductor device, executed by the processor, and configured to isolate the erroneously connected second enclosure.

4. The apparatus of claim 1, further comprising a notification module comprising executable code stored on the semiconductor device, executed by the processor, and configured to notify an administrator that the second enclosure is online.

5. The apparatus of claim 1, wherein the power control module is further configured to direct the second enclosure to power on through the fibre channel arbitrated loop communication channel.

6. The apparatus of claim 1, wherein the address module creates the valid address using an algorithm.

7. A system to integrate an enclosure, the system comprising:
    a first enclosure;
    a second enclosure comprising an initialization module configured to initialize the second enclosure;
    a control unit in communication with the first enclosure and comprising:
        a discovery module configured to discover a connection of the second enclosure to the first enclosure through a fibre channel arbitrated loop communication channel;
        an address module configured to create a valid address for the second enclosure;
        an assignment module configured to assign the address to the second enclosure; and
        a power control module configured to use the fibre channel arbitrated loop communication channel to cycle power to only the second enclosure to reinitialize the second enclosure, wherein reinitializing the second enclosure sets the address for the second enclosure.

8. The system of claim 7, further comprising a detection module configured to detect a connection error between the first enclosure and the second enclosure.

9. The system of claim 8, further comprising a mitigation module configured to isolate the erroneously connected second enclosure.

10. The system of claim 7, further comprising a notification module configured to notify an administrator that the second enclosure is online.

11. The system of claim 7, wherein the power control module is further configured to direct the second enclosure to power on through the fibre channel arbitrated loop communication channel in response to the discovery module discovering the second enclosure.

12. The system of claim 7, wherein the address module creates the valid address using an algorithm.

13. The system of claim 7, wherein the control unit is configured as a server.

14. A program of executable code stored on a semiconductor device and executed by a processor to perform operations to integrate an enclosure, the operations comprising:
    initializing a second enclosure;
    discovering a connection of the second enclosure to a first enclosure through a fibre channel arbitrated loop communication channel;
    creating a valid address for the second enclosure;
    assigning the address to the second enclosure; and
    cycling power to only the second enclosure using the fibre channel arbitrated loop communication channel, wherein cycling power reinitializes the second enclosure and sets the address for the second enclosure.

15. The program of claim 14, further comprising operations to detect a connection error between the first enclosure and the second enclosure and isolate the erroneously connected second enclosure.

16. The program of claim 15, further comprising operations to notify an administrator of the connection error.

17. The program of claim 14, further comprising operations to create the valid address using an algorithm.

18. The program of claim 14, further comprising operations to direct an administrator to create the valid address.

19. The program of claim 14, further comprising operations to notify an administrator that the second enclosure is online.

20. The program of claim 14, further comprising operations to direct an administrator to manually power on the second enclosure.

21. The program of claim 14, further comprising operations to issue a power-on command to the second enclosure through the fibre channel arbitrated loop communication channel wherein the second enclosure powers on in response to the power-on command.

22. A method for deploying computer infrastructure, comprising integrating computer-readable code into a computing system, wherein the code in combination with the computing system is capable of performing the following:
    initializing a second enclosure;
    discovering a connection of the second enclosure to a first enclosure through a fibre channel arbitrated loop communication channel;
    creating a valid address for the second enclosure;
    assigning the address to the second enclosure; and cycling power to only the second enclosure using the fibre channel arbitrated loop communication channel, wherein cycling power reinitializes the second enclosure and sets the address.

23. The method of claim 22, wherein the method comprises creating the valid address using an algorithm.

24. The method of claim 22, further comprising detecting a connection error between the first enclosure and the second enclosure and isolating the erroneously connected second enclosure.

25. An apparatus to integrate an enclosure, the apparatus comprising:

- a discovery module comprising executable code stored on a semiconductor device, executed by a processor, and configured to discover a connection of a second enclosure to a first enclosure through a fibre channel arbitrated loop communication channel;
- an initialization module comprising executable code stored on the semiconductor device, executed by the processor, and configured to initialize the second enclosure;
- an address module comprising executable code stored on the semiconductor device, executed by the processor, and configured to create a valid address for the second enclosure;
- a registration module comprising executable code stored on the semiconductor device, executed by the processor, and configured to register the address with a control unit; and
- a power control module comprising executable code stored on the semiconductor device, executed by the processor, and configured to use the fibre channel arbitrated loop communication channel to cycle power only to the second enclosure to reinitialize the second enclosure, wherein reinitializing the second enclosure, wherein reinitializing the second enclosure sets the address for the second enclosure.

26. An apparatus to integrate an enclosure, the apparatus comprising:

- means for initializing a second enclosure;
- means for discovering a connection of the second enclosure to a first enclosure through a fibre channel arbitrated loop communication channel;
- means for creating a valid address for the second enclosure;
- means for assigning the address to the second enclosure; and
- means for cycling power to only the second enclosure using the fibre channel arbitrated loop communication channel, wherein cycling power reinitializes the second enclosure and sets the address.

* * * * *